United States Patent [19]

Staebler

[11] 4,077,302
[45] Mar. 7, 1978

[54] APPARATUS FOR MACHINING END HOUSINGS FOR SLANT AXIS ROTARY MECHANISMS

[75] Inventor: Paul J. Staebler, Dunlap, Ill.

[73] Assignee: Caterpillar Tractor Co., Peoria, Ill.

[21] Appl. No.: 796,569

[22] Filed: May 13, 1977

[51] Int. Cl.² .......................... B23C 3/02; B24B 17/02
[52] U.S. Cl. .................................. 90/13.9; 51/33 W;
51/50 PC; 51/101 R; 90/20
[58] Field of Search ............... 90/13.9, 20, 24.3, 24.5;
51/33 W, 50 PC, 67, 97 R, 97 WC, 101 R

[56] References Cited

U.S. PATENT DOCUMENTS

| 3,975,866 | 8/1976 | Walker | 90/20 X |
|---|---|---|---|
| 4,033,231 | 7/1977 | Goloff et al. | 90/13.9 X |

*Primary Examiner*—Z. R. Bilinsky
*Attorney, Agent, or Firm*—Wegner, Stellman, McCord, Wiles & Wood

[57] ABSTRACT

An improved apparatus for machining the end walls of slant axis rotary mechanisms of the type having a base, a support pivoted on the base for rotation about a first axis, a shaft journalled on the support for rotation about a second axis nonparallel to the first axis, a work holder carried by the shaft for receiving a housing element of a slant axis rotary mechanism to have an end wall machined thereon, a tool adjacent the work holder operable to perform a machining operation on a housing element received on the work holder, a drive for rotating the shaft, and a mechanism responsive to rotation of the shaft for oscillating the support about the first axis in timed relation to rotation of the shaft. The improvement includes a mechanism for oscillating the shaft along the second axis at a desired rate to cause the end wall being machined to have a surface configured to compensate for deflections occurring during operation of the mechanism in which the machined housing is to be employed and a mechanism for cyclically advancing and retarding the position of the tool peripherally adjacent the work holder in timed relation to rotation of the shaft, enabling the use of a larger tool and therefore increasing the speed of the machining operation.

9 Claims, 5 Drawing Figures

APPARATUS FOR MACHINING END HOUSINGS FOR SLANT AXIS ROTARY MECHANISMS

BACKGROUND OF THE INVENTION

This invention relates to slant axis rotary mechanisms and, more particularly, to apparatus for machining the end walls on the housings employed in such mechanisms.

Prior art of possible relevance includes the commonly assigned, co-pending application of Donald F. Walker, Ser. No. 634,814, filed Nov. 24, 1975, and entitled "Method and Apparatus for Machining Housings For Slant Axis Rotary Mechanisms"; and the commonly assigned application of Goloff et al, Ser. No. 675,023, filed Apr. 8, 1976, and entitled "Apparatus For Machining End Housings".

As is well known, in four-cycle slant axis rotary mechanisms, the end walls interconnecting the radially inner and outer spherical walls are extremely difficult to form for a variety of reasons. For one, such walls appear to be conical and, in developed view, have sinusoidal characteristics as well.

Secondly, in many prior constructions, the machine marks extend on such walls generally circumferentially, which is parallel to the means direction of seal travel. As a consequence, the maintenance of a good oil film is made difficult, resulting in rapid seal wear.

These problems can be solved to a great degree through use of machining apparatus made according to either Walker or Goloff et al, identified above. Use of the Walker or Goloff et al apparatus is also slow by reason of the limitation to the use of cutting tools having a cutting surface with a radius equal to that of the apex seal to be used in the slant axis rotary mechanism considered tangentially to the rotor. Moreover, in the use of slant axis rotary mechanisms, particularly as engines, deflections occur in the housing and rotor parts and the Walker and Goloff et al apparatus can compensate for such deflections in the machining of the end walls only if deflections are generally conical in nature. They cannot compensate for deflections in the rotor due to translation, as opposed to tipping, or translation of the housing along the main shaft axis as opposed to tipping about the center point of the spherical rotor hub.

SUMMARY OF THE INVENTION

It is the principal object of the invention to provide a new and improved apparatus for machining the end housings for slant axis rotary mechanisms. More specifically, it is an object of the invention to provide such an apparatus wherein the machining process may be lessened in time and wherein provision is made whereby the surfaces generated during the machining process may include compensation for non-conical types of deflection occurring in the mechanism in which such housings are employed.

An exemplary embodiment of the invention represents an improvement over the apparatus of Goloff et al and includes a base. A support is pivoted on the base for rotation about a first axis and a shaft is journalled on the support for rotation about a second axis nonparallel to the first axis. A work holder for receiving a housing element to have an end wall machined thereon is carried by a work holder driven by the shaft and a tool is disposed adjacent the work holder to perform machining operations on housing elements received on the work holder. Means are provided for rotating the shaft and means are included to be responsive to rotation of the shaft for oscillating the support about the first axis in timed relation to the rotation of the shaft. Rotation of the shaft tends to effect the machining of the conical configuration of the end wall, while oscillation of the support tends to effect the machining of the sinusoidal configuration. In order to provide compensation on the machined surface for deflections, means are provided for oscillating the shaft along the second axis at a desired rate to alter the configuration of the surface being formed to compensate for deflections occurring during operation of the mechanism.

In order to speed up the machining process, means are provided whereby a larger cutting tool may be employed. Such means include means for cyclically advancing and retarding the position of the tool peripherally adjacent the work holder in timed relation to the rotation of the shaft to generate a housing end wall shaped identical to that generated by a small cutter having a radius equal to that of the apex seals employed in a slant axis rotary mechanism.

The invention contemplates that both means may be employed in a single apparatus or, in the alternate, either may be employed to the exclusion of the other.

In a highly preferred embodiment, the means for oscillating the shaft along its second axis comprises a cam surface formed on an end of the shaft and a cam follower engaging the cam surface. The cam follower may be carried by the support.

In a highly preferred embodiment, the advancing and retarding means includes a cam driven by the shaft. Generally, the tool will be mounted for movement about a third axis nonparallel to the first and second axes and will include a cam follower engaging the cam for moving the tool about the third axis.

Preferably, the tool is a rotary cutter driven about a cutter axis and there is provided a carrier mounting the tool for movement about the third axis. It is generally preferred that the cam for advancing the retarding the tool be carried by the shaft.

Other objects and advantages will become apparent from the following specification taken in connection with the accompanying drawings.

DESCRIPTION OF THE PREFERRED EMBODIMENT

Figure 1:
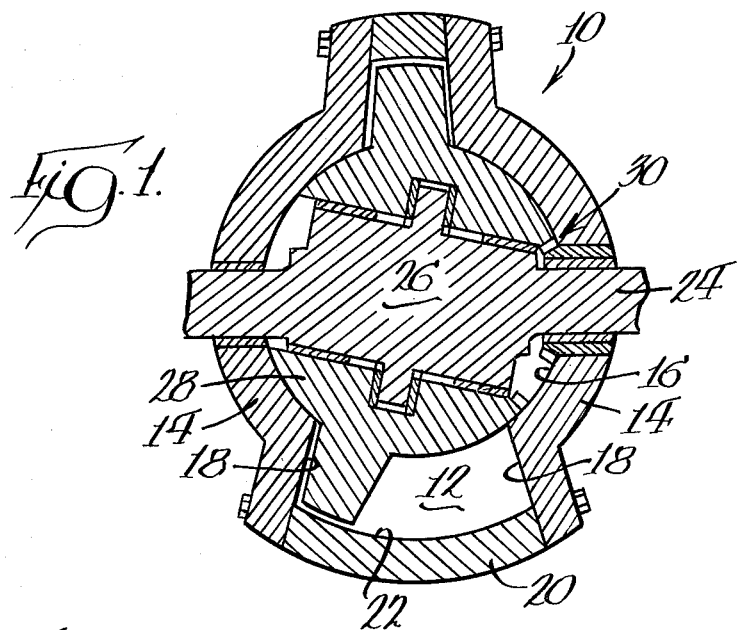
FIG. 1 is a sectional view of a typical slant axis rotary mechanism.

A typical slant axis rotary mechanism is illustrated in FIG. 1 in the form of a four-cycle engine and includes a housing, generally designated 10, defining an operating chamber 12. The housing 10 includes housing elements 14 which include a radially inner spherical wall 16 and opposed, end walls 18. A housing element 20 carries a radially outer spherical wall 22. A shaft 24 having an eccentric 26 is suitably journalled in the housing elements 14 and, in turn, journals the usual rotor 28 within the operating chamber 12. Phase gearing, generally designated 30, carried by the housing and by the rotor complete the mechanism in its most basic sense.

A variety of seals (not shown) are carried by the rotor. For example, peripheral seals are carried by the radially outer part of the rotor 28 and sealingly engage the radially outer spherical surface 22. Hub seals are carried by the rotor for sealing engagement with the radially inner surface 16 and plural apex seals on each side of the rotor flange engage respective ones of the end walls 18.

Such apex seals extend generally radially and, accordingly, in order to maintain a good oil film on the walls 18, it is desirable that the machine marks 18 thereon also extend generally radially as opposed to circumferentially. And, as is well known, in order to provide four-cycle characteristics, it is necessary that each of the end walls 18 be formed generally conically and sinusoidally.

Figure 2:
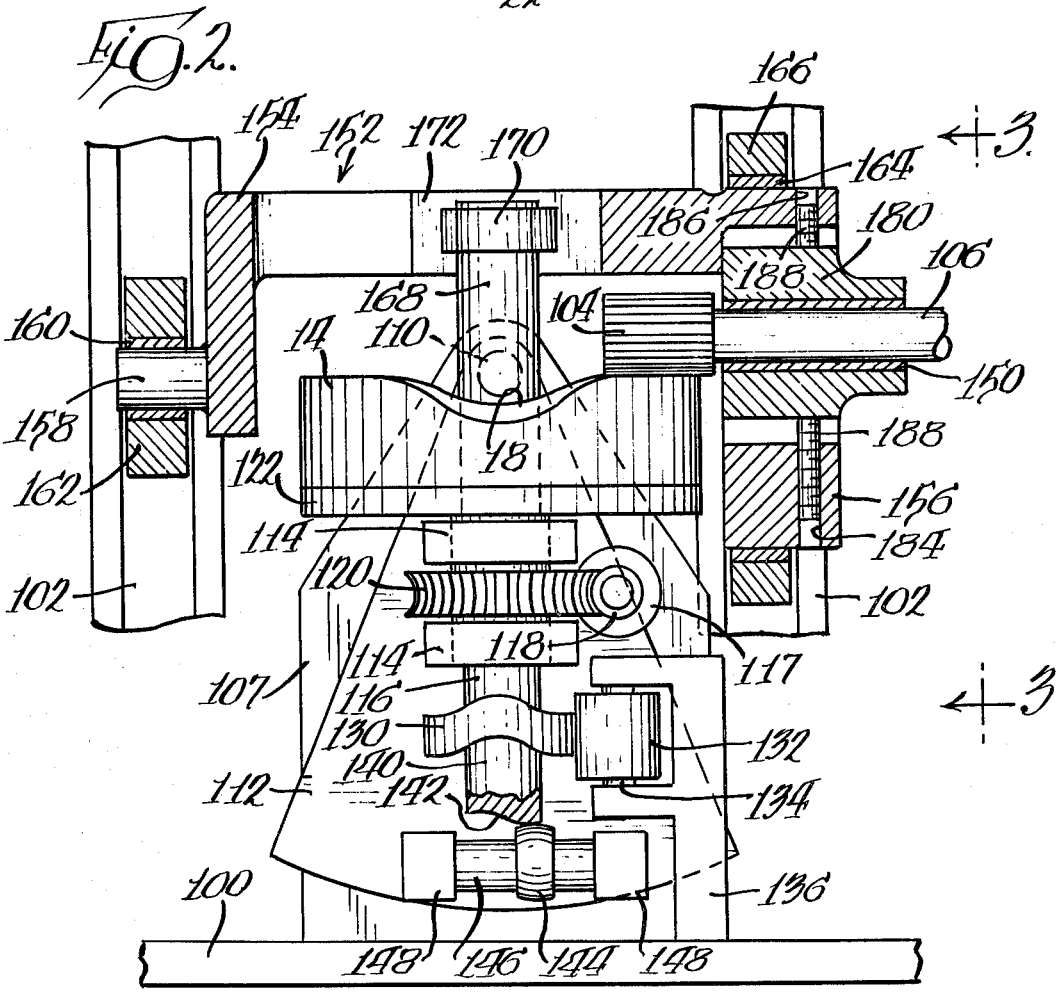
FIG. 2 is an elevational view of an apparatus for machining the end walls of the housing for the slant axis rotary mechanism with parts shown in section and parts broken away for clarity.

The mechanism for accomplishing the foregoing machining operation is illustrated in FIG. 2 and is generally along the lines of that disclosed in the previously identified Goloff et al application, the details of which are herein incorporated by reference, with the exception of improvements to be described hereinafter. The apparatus includes a base, generally designated 100. Supports 102 extend upwardly from the base and by means to be described in greater detail hereinafter, journal a cylindrical cutting tool 104 which is driven by a shaft 106 about the axis of the latter.

An upright 107, mounted on the base 100, by means of a pivot pin 110, pivotally supports a support 112 above the base 100. The support 112 is illustrated in the form of a pie-shaped plate and one side thereof is provided with bearings 114 for journalling a shaft 116. The axis of rotation of the shaft 116, in the embodiment illustrated in FIG. 2, is transverse to the axis of rotation of the support 112 about the pivot 110 and extends through that pivot axis. However, such a relationship is not critical, it only being required that the axis of rotation of the shaft 116 be nonparallel to the axis of rotation of the support 112.

A motor 117 is mounted in any suitable fashion on the support 112 for movement therewith and includes a worm 118 on its output shaft meshed with a worm gear 120 carried by the shaft 116. Consequently, upon energization of the motor 117, the shaft 116 will be rotated.

The midpoint of the shaft 116 carries a work holder schematically illustrated at 122 for receipt of a housing element 14 which is to have an end wall surface 18 machined thereon. Any suitable means known in the art may be employed to secure the housing element 14 to the work holder 122 for movement of the former with the latter. In general, the end housing 14 will have a center bore to enable it to be disposed on the work holder 122 about the shaft 116 in the manner illustrated in FIG. 2. Such a bore will, of course, ultimately receive the bearings for journalling the shaft 24 in the slant axis rotary mechanism.

The shaft 116 also carries an oval shaped cam 130 (the details of which may be ascertained by reference to the previously identified Goloff et al application) which engages a rotatable cam follower 132 journalled by a shaft 134 to a pedestal 136 on the base 100

As a result of the foregoing, energization of the motor 117 will cause rotation of the work holder 122 with the resultant rotation of the housing element 14 about the axis of the shaft 116 whereby the tool 104 will machine a portion of the surface 18. Responsive to such rotation, the cam 130 and cam follower 132 cause the support 112 to oscillate back and forth about the pivot axis provided by the pin 110 in timed relation to the rotation of the shaft 116. As a consequence, by reason of the configuration of the cam 130, a conical and sinusoidal end wall 18 will be formed on the housing element 14.

Such a housing end wall, without more, will follow the theoretical pattern desired by the designer of the slant axis rotary mechanism but will not include compensation for deflections occurring during the operation of such a mechanism.

In order to allow the end wall 18 to be machined with a surface including compensation for deflections, means are provided for oscillating the shaft 116 along its axis. In this respect, bearings 114 are such as to not only journal the shaft 116 for rotation, as mentioned previously, but also allow limited reciprocal movement of the shaft 116 along its axis. At the same time, by any suitable means, such as splining, the worm gear 120 is located on the shaft 116 so as to rotate the same and yet allow relative axial movement.

The lower end 140 of the shaft 116 is provided with a cam surface 142. The cam surface 142 rests upon a rotatable cam follower 144 mounted on a shaft 146 journalled in bearings 148 carried by the support 112. The follower 144 is offset from the center of the shaft 116, and thus the cam surface 142. As seen in FIG. 2, the cam surface 142 is configured so as to cyclically move the work holder 122, and thus the housing element 14, toward and away from the cutter 104 to provide the desired compensation at desired locations in the surface 18.

Where component interference due to deflection of the housing and rotor parts is to be eliminated, which interference will only occur at certain angular locations on the end wall, well known to those skilled in the art of slant axis rotary mechanisms, the surface 142 is configured so as to raise the work holder 122. As a consequence, more material will be machined from the surface 18 at the desired location so that when assembled in a slant axis rotary mechanism, greater clearance will be provided to eliminate the interference.

Conversely, where slant axis rotary mechanism parts have too great a clearance due to deflections, the corresponding part of the cam surface 142 is configured so as to allow the work holder 122 to descend. As a consequence, a lesser quantity of material will be machined from the housing element 14 at the desired area of the surface 118 thereof, so that clearance will be lessened when the mechanism is assembled and operated.

As alluded to previously, in prior art machining apparatus such as those of Walker and Goloff et al, it has been necessary to use a machining tool having an effective machining radius equal to the radius of the apex seals carried by the apexes of the rotor of the slant axis mechanism in which the housing element is to be installed. Such radii are quite small with the result that the cutters employed have relatively small cutting surfaces so that long machining times are required. The invention also contemplates the provision of means whereby larger cutting tools than those heretofore known may be employed to speed up the manufacturing process.

Figure 5:
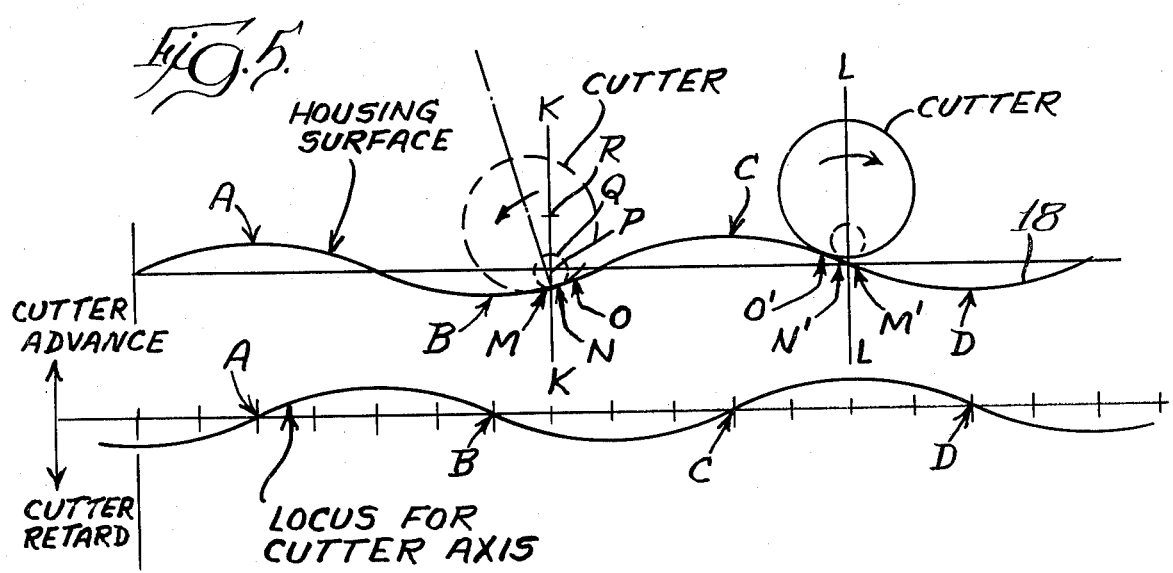
FIG. 5 is a schematic showing a developed view of the housing curve, cutter location in an apparatus made according to the invention, cutter location in a cutter made according to the previously identified Goloff et al application, and a timing curve for the cutter of the present invention.

Referring to FIG. 5, the theoretical developed projection of the conical surface, according to conventional design techniques, is given the legend HOUSING SURFACE and, if cut according to the prior art, may be considered as consisting of a loci of a point M, being the point of engagement of a point cutting tool (i.e. zero diameter cutter) with the housing and which approximates simple harmonic motion. The HOUSING SURFACE is a curve parallel to the theoretical curve, separated from it by the radius of the apex seal, which is equal to the distance between the points N and P. The actual contact of finite diameter cutting tool having a radius equal to that of the apex seal, the tool being shown in dotted lines and designated Q, is spaced a small distance M—N from the theoretical point M, which distance is variable due to the pressure angle typically involved in machine tools.

To speed up the manufacturing process, it is desired to use a larger cutter, shown in FIG. 5 schematically, and given the legend CUTTER. At the location K—K, normal to the mean surface of the end wall 18 and extending through the center of the cutter Q, the radius of the larger cutter would be disposed at the point R. As a result, its point of engagement with the surface 18 would be at the point O, the position of the point O varying with respect to the line K—K, dependent upon the slope of the surface 18 at that particular point and can shift to either side of the line K—K. At the points A, B, C and D, the point O would be coincident with the line K—K. However, at all other points, it would be spaced from the desired points of cutting (which lie on various lines K—K, for various positions of the cutter) by some distance.

In order to achieve good sealing, as is obtained with a smaller diameter cutter, it is necessary that the cutter be cyclically shifted throughout the machining cycle to engage the surface 18 at the point N rather than the point O. That is, it is necessary that in certain points of the machining cycle, the cutter be advanced about the periphery of the work holder, and thus the housing element 14, about the shaft 116 and at other points in the cycle, retarded with respect thereto. Only at the points A, B, C and D in the cycle should the cutter be neither retarded nor advanced.

Returning to FIGS. 2 and 4, the shaft 106 driving the cutter 104 is journalled by means of a bearing 150 received in an end of a carrier, generally designated 152. The carrier 152 is generally U-shaped, having legs 154 and 156. The leg 154 mounts an outwardly projecting stub shaft 158 received in a bearing 160 journalled in a block 162 secured to the post 102. The leg 156 of the carrier 152 is generally cylindrical in configuration and is received in a bearing 164 in a post 166 on the other post 102. The bearings 160 and 164 are coaxial and mount the tool 104 for rotation about an axis which is nonparallel to either the axis of the pin 110 or the shaft 116 as well as spaced from the cutter axis, that is, the axis of the shaft 106. While FIG. 2 shows the axis of rotation of the carrier 152 as being parallel to the cutter axis, the relation is not at all restricted to parallelism, it only being necessary that the axes be spaced.

The shaft 116 includes an upper end 168 which extends through the bore (not shown) mentioned previously in the housing element 14. A cam 170 is mounted on the shaft upper end 168 and engages a cam follower 172 carried by the bight of the U-shaped carriage 152.

The cam 170 is generally oval shaped and engages the cam follower 172 at a location spaced from the axis of rotation of the carrier 152.

As a consequence, when the shaft 116 is rotated, the resulting rocking motion of the carrier 152 will cause the tool 104 to be cyclically advanced and retarded, as mentioned previously, to ensure that its point of contact with the surface 18 coincides with the point N rather than the point O as would be the case if no such advancement or retardation took place. Thus, the surface 18 can be more rapidly machined through the use of a larger tool without sacrificing good sealing due to inaccuracies imposed by the larger tool radius.

The invention also contemplates the provision of an adjustment whereby the cutter axis defined by the shaft 106 relative to the axis of rotation of the carrier 152 can be selectively adjusted as desired.

Figure 3:
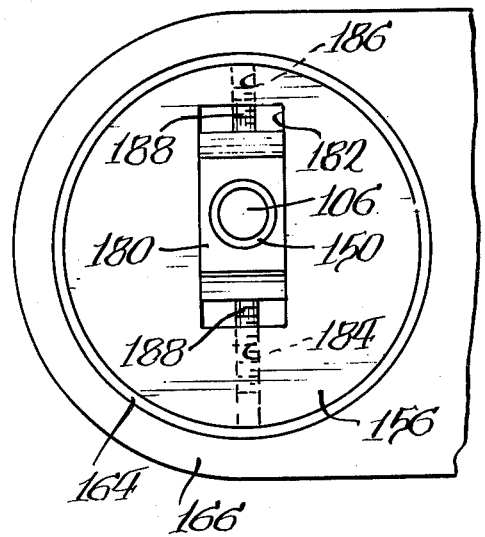
FIG. 3 is a view taken approximately along the line 3—3 of FIG. 2.
Figure 4:
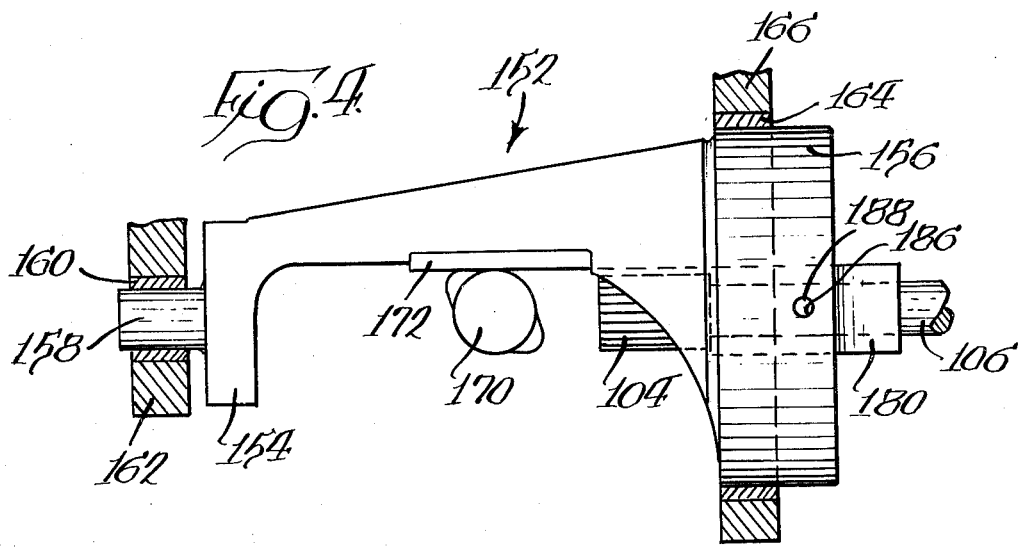
FIG. 4 is a fragmentary, plan view of the apparatus.

Referring to FIGS. 2-4, it will be seen that the bearing 150 journalling the shaft 106 is received in a bore in a block 180 which is movable in an elongated slot 182 in the leg 156 of the carriage 152. The slot 182 is elongated towards and away from the axis of rotation of the carriage 152. Tapped bores 184 and 186 extend from opposite sides of the leg 156 to the ends of the slot 182 and receive threaded, positioning screws 188 which bear against opposite sides of the block 180. By appropriately adjusting the screws 188 in their respective bores, the position of the block 180 within the slot 182 may be selectively varied to locate the tool 104 in any desired position.

From the foregoing, it will be appreciated that an apparatus for machining the end housings of slant axis rotary mechanisms made according to the invention includes means whereby deflections of various sorts, including those of a non-conical nature, can be compensated for in the surfaces of the end housings of the mechanisms. The invention also enables the use of a larger grinding tool, thereby speeding up the manufacturing process.

It is to be noted that the use of cams is an important feature of the invention in that once the apparatus is set up, variability from one end surface to the next will be absolutely minimized. While the various cams need not all be carried by the shaft 116, such a feature is a preferred embodiment of the invention in that it minimizes sychronization problems since all components adjusting the position of the housing element or the cutter have a single, common drive.

The embodiments of the invention in which an exclusive property or privilege is claimed are defined as follows:

1. In an apparatus for machining the end walls of slant axis rotary mechanisms including a base; a support pivoted on said base for rotation about a first axis; a shaft journalled on said support for rotation about a second axis nonparallel to said first axis; a work holder carried by said shaft for receiving a housing element of a slant axis rotary mechanism to have an end wall machined thereon; means, including a tool adjacent said work holder, operable to perform a machining operation on a housing element received on said work holder; means for rotating said shaft; and means responsive to rotation of said shaft for oscillating said support about said first axis in timed relation to rotation of said shaft, the improvement comprising: means for oscillating said shaft along said second axis at a desired rate to cause the end wall being machined to have a surface configurated to compensate for deflections occurring during operation of the machanism.

2. The apparatus of claim 1 wherein said second axis oscillating means comprises a cam surface formed on an end of said shaft, and a cam follower engaging said cam surface.

3. The apparatus of claim 2 wherein said cam follower is carried by said support.

4. In an apparatus for machining the end walls of slant axis rotary mechanisms including a base; a support pivoted on said base for rotation about a first axis; a shaft journalled on said support for rotation about a second axis nonparallel to said first axis; a work holder carried by said shaft for receiving a housing element of a slant axis rotary mechanism to have an end wall machined thereon; means, including a tool adjacent said work holder, operable to perform a machining operation on a housing element received on said work holder; means for rotating said shaft; and means responsive to rotation of said shaft for oscillating said support about said first axis in timed relation to rotation of said shaft, the improvement comprising: means for cyclically advancing and retarding the position of said tool peripherally adjacent said work holder in timed relation to the rotation of said shaft.

5. The apparatus of claim 4 wherein said advancing and retarding means includes a cam driven by said shaft.

6. The apparatus of claim 5 wherein said tool is mounted for movement about a third axis nonparallel to said first and second axes and further including a cam follower engaging said cam for moving said tool about said third axis.

7. The apparatus of claim 4 wherein said tool is a rotary cutter driven about a cutter axis and further including means mounting said tool for movement about a third axis different from said cutter axis and nonparallel to said first and second axes, and wherein said advancing and retarding means comprises a cam driven by said shaft and a cam follower engaging the cam and carried by said mounting means.

8. The apparatus of claim 7 wherein said cam is carried by said shaft.

9. In an apparatus for machining the end walls of slant axis rotary mechanisms including a base; a support pivoted on said base for rotation about a first axis; a shaft journalled on said support for rotation about a second axis nonparallel to said first axis; a work holder carried by said shaft for receiving a housing element of a slant axis rotary mechanism to have an end wall machined thereon; means, including a tool adjacent said work holder, operable to perform a machining operation on a housing element received on said work holder; means for rotating said shaft; and means responsive to rotation of said shaft for oscillating said support about said first axis in timed relation to rotation of said shaft, the improvement comprising: means for oscillating said shaft along said second axis at a desired rate to cause the end wall being machined to have a surface configured to compensate for deflections occurring during operation of the mechanism and means for cyclically advancing and retarding the position of said tool peripherally adjacent said work holder in timed relation to the rotation of said shaft.

* * * * *